(12) United States Patent
Thompson

(10) Patent No.: US 8,338,989 B2
(45) Date of Patent: Dec. 25, 2012

(54) INVERTER POWER SYSTEM

(75) Inventor: Christopher Thompson, Narragansett, RI (US)

(73) Assignee: First Solar, Inc., Perrysburg, OH (US)

( * ) Notice: Subject to any disclaimer, the term of this patent is extended or adjusted under 35 U.S.C. 154(b) by 337 days.

(21) Appl. No.: 12/722,299

(22) Filed: Mar. 11, 2010

(65) Prior Publication Data
US 2011/0221273 A1    Sep. 15, 2011

(51) Int. Cl.
H02J 1/00 (2006.01)
H02J 3/00 (2006.01)
H02M 7/5383 (2007.01)

(52) U.S. Cl. .................. 307/85; 307/29; 363/74
(58) Field of Classification Search .......... 307/29, 307/85, 45; 363/74
See application file for complete search history.

(56) References Cited

U.S. PATENT DOCUMENTS

| 5,923,100 | A | 7/1999 | Lukens et al. | |
|---|---|---|---|---|
| 6,304,006 | B1 | 10/2001 | Jungreis | |
| 6,339,538 | B1 | 1/2002 | Handleman | |
| 2003/0047209 | A1 * | 3/2003 | Yanai et al. | 136/291 |
| 2006/0082348 | A1 | 4/2006 | Kehrli et al. | |
| 2009/0145480 | A1 | 6/2009 | Adest et al. | |
| 2009/0303763 | A1 * | 12/2009 | Yuguchi et al. | 363/79 |
| 2010/0001587 | A1 | 1/2010 | Casey et al. | |

FOREIGN PATENT DOCUMENTS

JP    2009284559    *    3/2009

OTHER PUBLICATIONS

PCT International Preliminary Report on Patentability, Application No. PCT/US2011/027550, 6 pages, Sep. 11, 2012.*
PCT International Search Report (2 pages), dated May 12, 2011.

* cited by examiner

*Primary Examiner* — Michael Rutland Wallis
(74) *Attorney, Agent, or Firm* — Dickstein Shapiro LLP

(57) ABSTRACT

A photovoltaic system may include a DC to AC inverter, a voltage sensor configured to measure an input voltage from a photovoltaic array, and a controller configured to calculate a voltage differential.

18 Claims, 3 Drawing Sheets

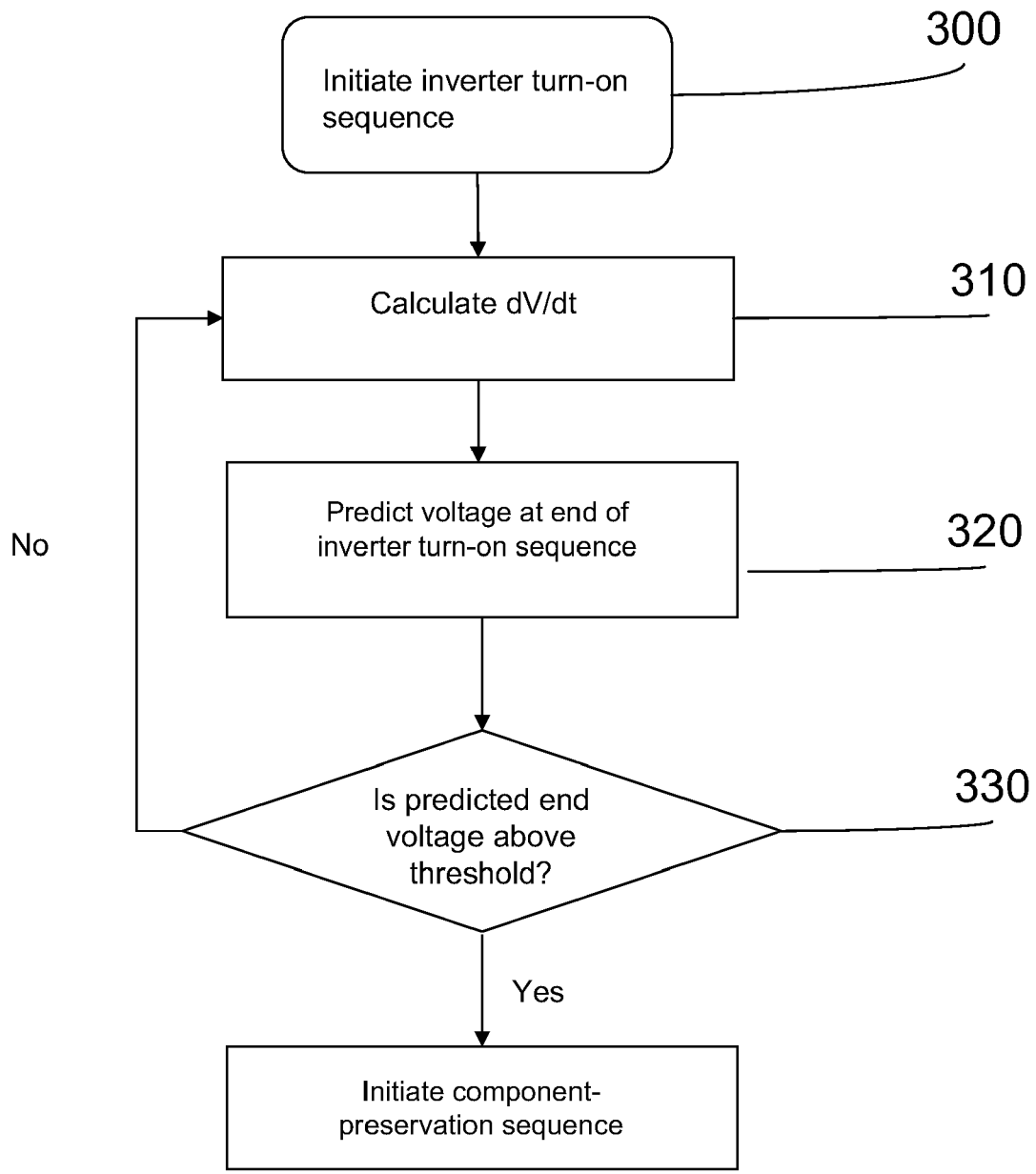

INVERTER POWER SYSTEM

TECHNICAL FIELD

The present invention relates to photovoltaic systems and methods of producing electricity.

BACKGROUND

Photovoltaic systems may use inverters to convert direct current (DC) from a photovoltaic array into alternating current (AC). Current systems for converting AC to DC power are inefficient.

DESCRIPTION OF DRAWINGS

FIG. 3 is a schematic illustrating the steps of powering on a DC to AC inverter.

DETAILED DESCRIPTION

Figure 1:
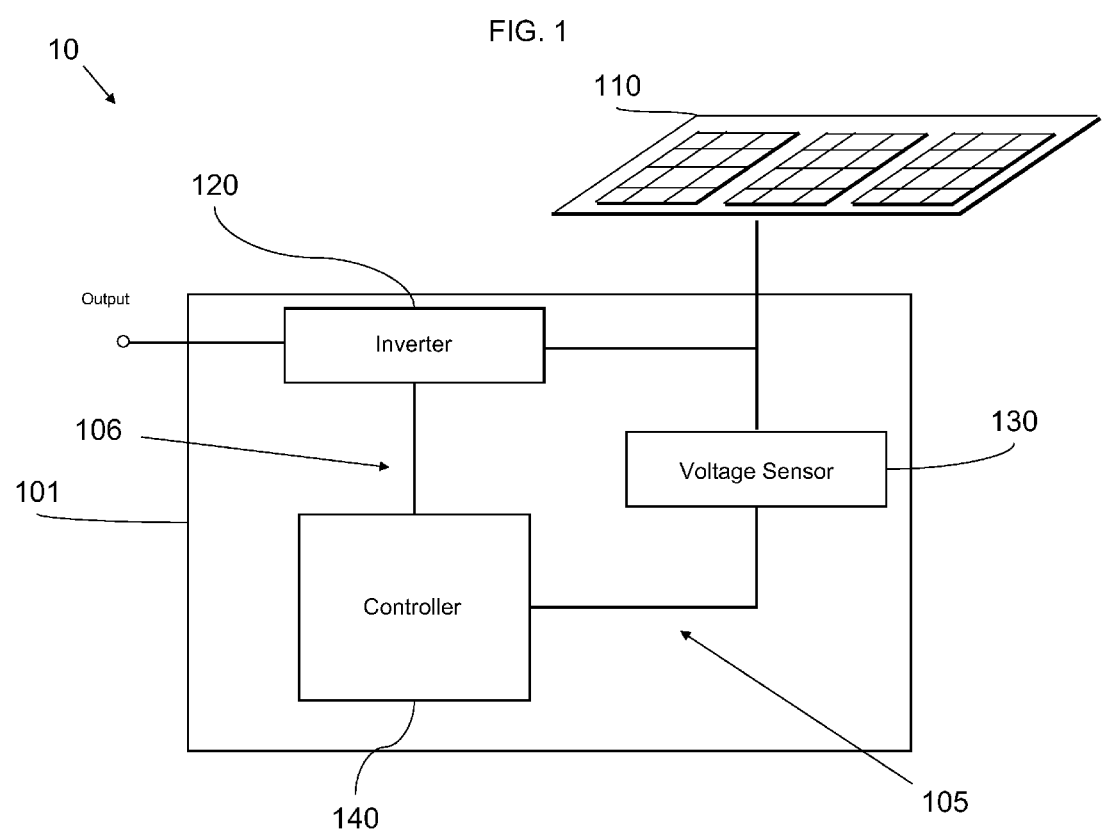
FIG. 1 is a schematic of a photovoltaic system including a DC to AC inverter.

An inverter can be used in photovoltaic systems to convert direct current (DC) from a photovoltaic array into alternating current (AC). A photovoltaic system may thus include a DC to AC inverter connected to a photovoltaic array of interconnected modules. The inverter may have a minimum operating power setting, above which the inverter converts DC power to AC power.

Currently, inverters for photovoltaic arrays use control sequences for determining how to turn on in the morning. Essentially, the inverters track the DC voltage from a photovoltaic array and turn on when appropriate voltage has been reached. Typically, this method works adequately. With thin-film photovoltaic modules, however, voltages can be high (e.g., above about 800 V) compared to conventional modules, placing the inverter at risk of an overvoltage condition that can damage key components of the inverter, including, for example, the insulated gate bipolar transistors (IGBTs) or capacitors. This situation may occur because the inverter typically only measures the array voltage and not the rate of change of the array voltage. The situation may also occur because the inverter can take several minutes to complete the turn-on sequence. If the array voltage continues to rise during this period then the inverter may be damaged by overvoltage.

To address these shortcomings, the inverter unit may be configured to measure both array voltage and change in array voltage over time (i.e., the derivative (dV/dt) of the array voltage), which can allow the inverter to predict the voltage at the end of the turn-on sequence, and thus predict if the voltage will rise excessively. In certain circumstances, the inverter can be configured to allow for a rapid turn-on sequence. For example, the turn-on sequence can be reduced from more than about 5 minutes, for example, to less than about 5 minutes, less than about 3 minutes, or less than about 1 minute. By measuring the voltage derivative dV/dt, and shortening the time for the turn-on sequence, excessive voltages can be avoided or prevented. One technique for accelerating the inverter turn-on sequence is to implement inverter diagnostics when array current is no longer present, such as at night. This can be done by configuring the inverter to process quadrature power sourced from the power grid rather than power from the photovoltaic array.

In one aspect, a DC to AC inverter module may include a DC to AC inverter configured to convert DC power to AC power. The DC to AC inverter module may include a voltage sensor configured to measure an input voltage from a photovoltaic array, and to communicate the measured input voltage. The DC to AC inverter module may include a controller in data communication with the voltage sensor, and in data communication with the DC to AC inverter. The controller may be configured to compare a first input voltage received from the voltage sensor with a second input voltage received from the voltage sensor, to calculate a voltage differential.

The controller may be configured to calculate a derivative of a photovoltaic array voltage at an end of a powering on sequence for the DC to AC inverter. The controller may be configured to output an ON signal to the DC to AC inverter if a maximum available power output is higher than or equal to a minimum operating power setting of the DC to AC inverter. Upon receiving the ON signal from the controller, the DC to AC inverter may initiate a sequence of converting DC power received from a photovoltaic array to AC power. The controller may be configured to output an ON signal to the DC to AC inverter. Upon receiving the ON signal from the controller, the DC to AC inverter may initiate a rapid powering on sequence. The DC to AC inverter may be connected to a power grid. The DC to AC inverter may be configured to process power received from the power grid. The controller may be configured to communicate a SWITCH signal to the DC to AC inverter. Upon receiving the SWITCH signal from the controller, the DC to AC inverter may switch from processing power received from a photovoltaic array to processing power received from the power grid.

In another aspect, a photovoltaic system may include a photovoltaic array including a plurality of photovoltaic modules. The photovoltaic system may include a DC to AC inverter in communication with the photovoltaic array. The DC to AC inverter may be configured to convert DC power to AC power. The photovoltaic system may include a voltage sensor configured to measure an input voltage from the photovoltaic array. The photovoltaic system may include a controller in data communication with the voltage sensor, and in data communication with the DC to AC inverter. The controller may be configured to compare a first input voltage received from the voltage sensor with a second input voltage received from the voltage sensor, to calculate a voltage differential.

The controller may be configured to calculate a derivative of a photovoltaic array voltage at an end of a powering on sequence for the DC to AC inverter. The controller may be configured to output an ON signal to the DC to AC inverter if a maximum available power output is higher than or equal to a minimum operating power setting of the DC to AC inverter. Upon receiving the ON signal from the controller, the DC to AC inverter may initiate a sequence of converting DC power received from a photovoltaic array to AC power. The controller may be configured to output an ON signal to the DC to AC inverter. Upon receiving the ON signal from the controller, the DC to AC inverter may initiate a rapid powering on sequence. The DC to AC inverter may be connected to a power grid. The DC to AC inverter may be configured to process power received from the power grid. The controller may be configured to communicate a SWITCH signal to the DC to AC inverter. Upon receiving the SWITCH signal from the controller, the DC to AC inverter may switch from processing power received from a photovoltaic array to processing power received from the power grid. The photovoltaic system may include a remote computing platform. The remote computing platform may include the controller.

In another aspect, a method of powering on a photovoltaic inverter may include initiating a powering on sequence for a DC to AC inverter. The DC to AC inverter may be connected to a photovoltaic array. The method may include comparing a first input voltage received from a voltage sensor connected to the photovoltaic array, with a second voltage received from the voltage sensor connected to the photovoltaic array, to calculate a voltage differential.

The method may include calculating a voltage derivative of the photovoltaic array at an end of a powering on sequence for the DC to AC inverter. The method may include powering on the DC to AC inverter if a maximum available power output is higher than or equal to a minimum operating power setting of the DC to AC inverter. The method may include initiating a rapid powering on sequence for the DC to AC inverter. The method may include processing power received from a power grid via the DC to AC inverter. The method may include switching the DC to AC inverter from processing power received from the photovoltaic array to processing power received from the power grid. The method may include switching the DC to AC inverter from processing power received from the power grid to processing power received from the photovoltaic array.

Referring to FIG. 1, by way of example, a photovoltaic system 10 may include a plurality of photovoltaic modules electrically connected to form a photovoltaic array 110. Each of the photovoltaic modules may include any suitable photovoltaic device material, including, for example, cadmium telluride or CIGS. Photovoltaic array 110 may be electrically connected to DC to AC conversion system 101, which along with photovoltaic array 110, may be part of photovoltaic system 10. DC to AC conversion system 101 may include DC to AC inverter 120, which may be electrically connected to photovoltaic array 110 to convert DC power originating from photovoltaic array 110 into AC power for any suitable use, including, for example, a utility grid.

DC to AC conversion system 101 may also include a controller 140 and a voltage sensor 130. Controller 140 may also be located outside of DC to AC conversion system 101, and may communicate with various components of photovoltaic system 10 remotely. Controller 140 may be connected to inverter 120 and voltage sensor 130. Controller 140 may be connected to voltage sensor 130 via a first data interface 105. First data interface 105 may include any suitable form of communication, including, for example, any suitable form of hardwire or wireless communication. Voltage sensor 130 may be configured to measure voltage from photovoltaic array 110. Voltage sensor 130 may be configured to measure multiple voltages from photovoltaic array 110, over any desired period of time. Voltage sensor 130 may be configured to communicate one or more measured voltages to controller 140 via first data interface 105. Controller 140 may be configured to compare one or more voltages received from voltage sensor 130 via first data interface 105. Controller 140 may be configured to calculate a difference in voltages received from voltage sensor 130. Controller 140 may be configured to calculate the rate of change in the voltage coming from photovoltaic array 110 over a period of time. For example, controller 140 may be configured to compile multiple voltage data points (V) over a period of time (t), using data received from voltage sensor 130. Controller 140 may track the time at which each voltage point is measured and compile a table to be stored in a memory component of controller 140. Controller 140 may use one or more data sets from the table to calculate a voltage derivative (dV/dt), where V represents an input voltage from photovoltaic array 110, and t represents a time at which a given voltage was measured. The data sets stored in the memory component of controller 140 can correspond to a chart V(t), where the calculated dV/dt represents the slope of the voltage. Controller 140 may use the data sets stored in the memory component of controller 140 to calculate multiple values for the voltage derivative dV/dt. The calculated voltage derivative dV/dt may correspond to the rate of change in voltage from photovoltaic array 110 over a period of time. Controller 140 thus may determine how quickly voltage from photovoltaic array 110 is rising. Controller 140 can use the calculated derivative to predict the voltage at the end of a turn-on sequence for inverter 120. Controller 140 can include a memory component which stores a threshold voltage for the turn-on sequence of inverter 120. The threshold voltage may define a maximum voltage which internal components of the system may be able to withstand. Controller 140 may be configured to initiate a process to protect various components of DC to AC inverter system 101.

For example, controller 140 may be configured to send an OFF signal to inverter 120 if the calculated end voltage is equal to or more than the threshold voltage. Upon receiving the OFF signal, inverter 120 may halt its turn-on sequence for any suitable period of time. For example, inverter 120 may halt the turn-on sequence indefinitely. Alternatively, inverter 120 may halt the turn-on sequence for a predefined period of time, and then automatically reinitiate the turn-on sequence. For example, upon receiving an OFF signal from controller 140, inverter 120 may halt the turn-on sequence for several minutes (e.g., more than about 1 minute, more than about 2 minutes, or more than about 5 minutes) to protect inverter 120 from an overvoltage condition, and reinitiate the turn-on sequence thereafter. Controller 140 may also be configured to reinitiate the turn-on sequence by communicating an ON signal to inverter 120, after sending an OFF signal to inverter 120. Upon receiving the ON signal from controller 140, inverter 120 may reinitiate its turn-on sequence. Controller 140 may wait for any suitable time period (e.g., more than about 1 minute, more than about 2 minutes, or more than about 5 minutes), following sending the OFF signal, to send the ON signal. Controller 140 may also be configured to initiate the first turn-on sequence for inverter 120. Controller may use any number of parameters to determine when to initiate a turn-on sequence, including, for example, the level of voltage as determined by voltage sensor 130 and/or time of day. Controller 140 may be connected to inverter 120 via a second data interface 106. Second data interface 106 may include any suitable means of communication, including, for example, any suitable form of hardwire or wireless communications. Controller 140 may be configured to communicate the OFF signal to inverter 120 via second data interface 106. Controller 140 can be configured to direct inverter 120 to turn back on at any suitable time.

DC to AC conversion system 101 may be configured in various ways to reduce the voltage derivative dV/dT. For example, inverter 120 may be configured to initiate a rapid turn-on sequence. Controller 140 may be configured to communicate initiation of the rapid turn-on sequence to inverter 120. DC to AC conversion system 101 may also be configured to implement inverter diagnostics at night. For example, DC to AC conversion system 101 can be configured to process quadrature power from a power grid, rather than photovoltaic array 110 during nighttime.

Figure 2:
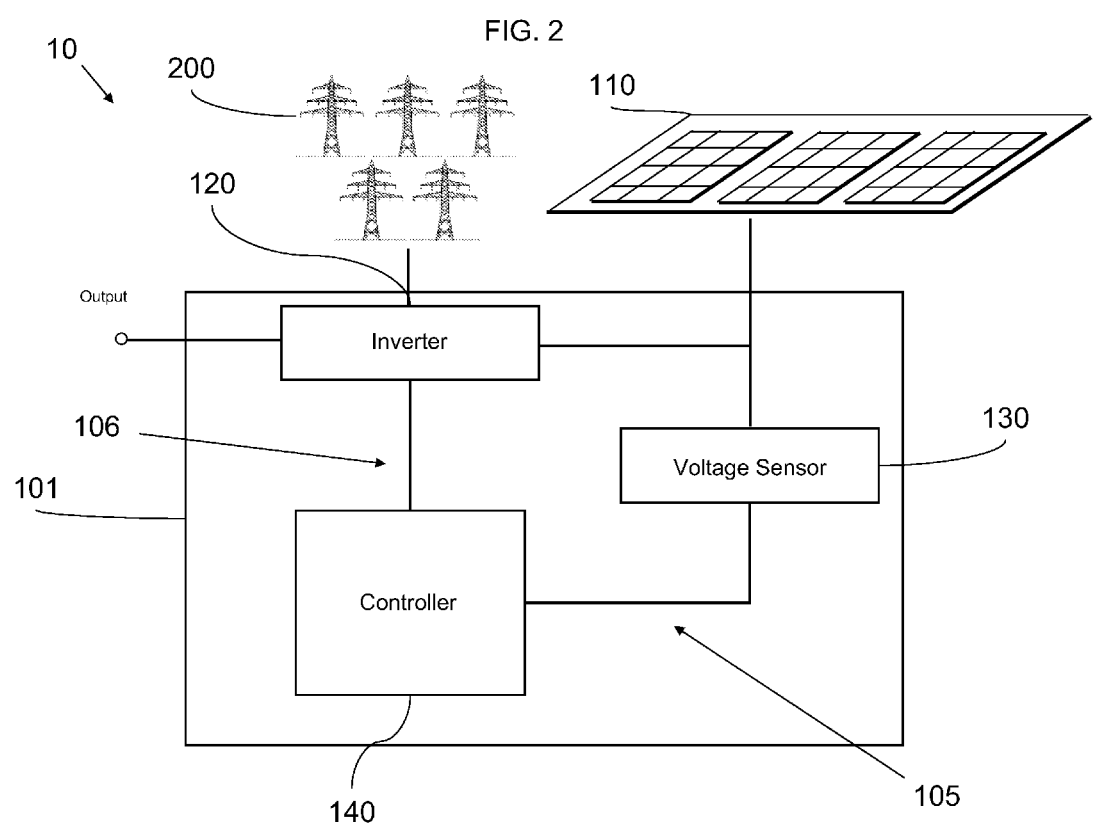
FIG. 2 is a schematic of a photovoltaic system including a DC to AC inverter.

Referring to FIG. 2, by way of example, inverter 120 from DC to AC conversion system 101 may be connected to power grid 200. During night conditions, when photovoltaic array 110 is no longer producing power, inverter 120 can be configured to process power from power grid 200 to implement inverter diagnostics. For example, controller 140 may be configured to communicate a SWITCH signal to inverter 120. Upon receiving the SWITCH signal, inverter 120 can switch from processing voltage from photovoltaic array 110, and begin processing voltage from power grid 200. Once daylight conditions return, and photovoltaic array 110 has generated an adequate amount of power, inverter 120 can switch back to processing power from photovoltaic array 110. For example, controller 140 may be configured to communicate another SWITCH signal to inverter 120. Upon receiving the second SWITCH signal from controller 140, inverter 120 may revert back to processing power from photovoltaic array 110.

Controller 140 may be configured to control various aspects of the power conversion process for DC to AC inverter system 101 and photovoltaic system 10. As noted above, controller 140 may communicate various signals to inverter 120, including, for example, any one of an ON, OFF, or SWITCH signal. Any one of the ON, OFF, and SWITCH signals may consist of any suitable signal to convey a respective intended action to inverter 120. For example, any of the ON, OFF, or SWITCH signals may contain any suitable high or low signal, which inverter 120 may interpret to respond with appropriate action. For example, an ON signal may include a high voltage signal, for example, about 5 V; and an OFF signal may include a low voltage signal, for example, about −5 V. Alternatively, the ON signal may include a low voltage signal, and the OFF signal may include a high voltage signal. The low and high voltage signals may correspond to any suitable voltage. For example, a low voltage signal may be less than about 10 V, less than about 5 V, less than about 0 V, less than about −5 V, or more than about −5 V. The high voltage signal may be more than about −5 V, more than about 0 V, more than about 5 V, or less than about 10 V. The SWITCH signal may include any suitable low or high voltage signal, including, for example, less than about 10 V, less than about 5 V, less than about 0 V, less than about −5 V, more than about −5 V, more than about 0 V, more than about 5 V, or less than about 10 V. The input of inverter 120 receiving the ON, OFF, and SWITCH signals may have a default voltage setting, including, for example, more than about −5 V, more than about 0 V, or less than about 5 V. Upon receiving any of the ON, OFF, or SWITCH signals, inverter 120 can respond with any suitable action, including, for example, initiating a turn-on sequence, temporarily halting a turn-on sequence, or indefinitely halting a turn-on sequence. Inverter 120 may also respond by suspending the processing of power from a source. For example, upon receiving a SWITCH signal from controller 140 via second data interface 106, inverter 120 may stop processing power from photovoltaic array 110, and begin processing power from a secondary source, which may include, any suitable source, including, for example, a utility grid. Inverter 120 may include one or more inputs to receive the ON, OFF, or SWITCH signals from controller 140; therefore, controller 140 and inverter 120 may be connected by multiple data interfaces to communicate the various signals. Inverter 120 may include programmable logic or one or more software modules to interpret any one of the ON, OFF, or SWITCH signals, to determine appropriate action.

FIG. 3 illustrates the improved turn-on sequence for inverter 120. At step 300, an inverter turn-on sequence is initiated. Inverter 120 can initiate the turn-on sequence itself, or controller 140 can output a turn-on signal to inverter 120, directing it to begin powering up. At step 310, a voltage derivative dV/dt may be calculated. The voltage derivative may be calculated, for example, using data collected by voltage sensor 130, which may measure one or more voltages over one or more periods of time. Controller 140 may store multiple values of voltage (V) and time (t) and store them in a table. These values can be used to calculate a voltage derivate dV/dt. At step 320, voltage derivative dV/dt may be used to predict a voltage at the end of the inverter turn-on sequence. At step 330, the predicted end voltage may be compared to a threshold voltage. The threshold voltage may be stored in a memory component of controller 140. Controller 140 may compare the predicted end voltage with the stored threshold voltage to determine whether the input voltage for inverter 120 will exceed the voltage threshold. If the predicted end voltage is equal to or more than the threshold voltage, the method may proceed to step 340, where DC to AC conversion system 101 may initiate a component-preservation sequence. For example, upon determining that the predicted end voltage is equal to or more than the threshold voltage, controller 140 may halt the inverter turn-on sequence to prevent damage from occurring to system components. For example, controller 140, upon determining that the predicted end voltage is equal to or more than the threshold voltage stored therein, can communicate an OFF signal to inverter 120 via second data interface 106. If the predicted end voltage is not equal to or more than the threshold voltage, the method can return to step 310, and calculate a new voltage derivative dV/dt. Controller 140 may calculate the new voltage derivative by compiling new values for voltage (V) and time (t) in the table, and factoring them into a new voltage derivative calculation. The new voltage derivative dV/dt can be used to make a new end voltage prediction, which can again be compared with the threshold voltage. The method may also reroute to step 300, and reinitiate the turn-on sequence altogether.

The embodiments described above are offered by way of illustration and example. It should be understood that the examples provided above may be altered in certain respects and still remain within the scope of the claims. It should be appreciated that, while the invention has been described with reference to the above preferred embodiments, other embodiments are within the scope of the claims.

What is claimed is:

1. A DC to AC inverter module comprising:
a DC to AC inverter configured to convert DC power to AC power;
a voltage sensor configured to measure an input voltage from a photovoltaic array, and to communicate the measured input voltage; and
a controller in data communication with the voltage sensor, and in data communication with the DC to AC inverter, wherein the controller is configured to compare a first input voltage received from the voltage sensor during a powering on sequence with a second input voltage received from the voltage sensor during the powering on sequence to calculate a voltage differential, and wherein the controller is further configured to use the calculated voltage differential to predict an end voltage of the powering on sequence.

2. The DC to AC inverter module of claim 1, wherein the controller is configured to output an OFF signal to the DC to AC inverter if the predicted end voltage of the powering on sequence is higher than a threshold voltage, wherein upon receiving the OFF signal from the controller, the DC to AC inverter halts the powering on sequence.

3. The DC to AC inverter module of claim 1, wherein the controller is configured to output an ON signal to the DC to AC inverter, wherein upon receiving the ON signal from the controller, the DC to AC inverter initiates the powering on sequence.

4. The DC to AC inverter module of claim 1, wherein the DC to AC inverter is connected to a power grid, and wherein the DC to AC inverter is configured to process power received from a power grid.

5. The DC to AC inverter module of claim 4, wherein the controller is configured to communicate a SWITCH signal to the DC to AC inverter, wherein upon receiving the SWITCH signal from the controller, the DC to AC inverter switches from processing power received from a photovoltaic array to processing power received from a power grid.

6. A photovoltaic system comprising:
   a photovoltaic array comprising a plurality of photovoltaic modules;
   a DC to AC inverter in communication with the photovoltaic array, wherein the DC to AC inverter is configured to convert DC power generated by the photovoltaic array to AC power;
   a voltage sensor configured to measure an input voltage from the photovoltaic array; and
   a controller in data communication with the voltage sensor and in data communication with the DC to AC inverter,
   wherein the controller is configured to compare a first input voltage received from the voltage sensor during a powering on sequence with a second input voltage received from the voltage sensor during the powering on sequence to calculate a voltage differential, and wherein the controller is further configured to use the calculated voltage differential to predict an end voltage of the powering on sequence.

7. The photovoltaic system of claim 6, wherein the controller is configured to output an OFF signal to the DC to AC inverter if the predicted end voltage of the powering on sequence is higher than a threshold voltage, wherein upon receiving the OFF signal from the controller, the DC to AC inverter halts the powering on sequence.

8. The photovoltaic system of claim 6, wherein the controller is configured to output an ON signal to the DC to AC inverter, wherein upon receiving the ON signal from the controller, the DC to AC inverter initiates the powering on sequence.

9. The photovoltaic system of claim 6, wherein the DC to AC inverter is connected to a power grid, and wherein the DC to AC inverter is configured to process power received from a power grid.

10. The photovoltaic system of claim 9, wherein the controller is configured to communicate a SWITCH signal to the DC to AC inverter, wherein upon receiving the SWITCH signal from the controller, the DC to AC inverter switches from processing power received from a photovoltaic array to processing power received from a power grid.

11. The photovoltaic system of claim 6, further comprising a remote computing platform, wherein the remote computing platform comprises the controller.

12. A method of powering on a photovoltaic inverter, the method comprising:
    initiating a powering on sequence for a DC to AC inverter, wherein the DC to AC inverter is connected to a photovoltaic array;
    comparing a first input voltage received from a voltage sensor connected to the photovoltaic array during the powering on sequence with a second voltage received from the voltage sensor connected to the photovoltaic array during the powering on sequence, to calculate a voltage differential; and
    using the calculated voltage differential to predict an end voltage of the powering on sequence.

13. The method of claim 12, further comprising halting the powering on sequence if the predicted end voltage of the powering on sequence is higher than a threshold voltage.

14. The method of claim 12, further comprising powering on the DC to AC inverter if a maximum available power output is higher than or equal to a minimum operating power setting of the DC to AC inverter.

15. The method of claim 12, further comprising initiating sapid the powering on sequence for the DC to AC inverter.

16. The method of claim 12, further comprising processing power received from a power grid via the DC to AC inverter.

17. The method of claim 16, further comprising switching the DC to AC inverter from processing power received from the photovoltaic array to processing power received from the power grid.

18. The method of claim 17, further comprising switching the DC to AC inverter from processing power received from the power grid to processing power received from the photovoltaic array.

* * * * *

UNITED STATES PATENT AND TRADEMARK OFFICE
CERTIFICATE OF CORRECTION

| | |
|---|---|
| PATENT NO. | : 8,338,989 B2 |
| APPLICATION NO. | : 12/722299 |
| DATED | : December 25, 2012 |
| INVENTOR(S) | : Christopher Thompson |

It is certified that error appears in the above-identified patent and that said Letters Patent is hereby corrected as shown below:

Column 1, line 12, the following error is corrected: "AC to DC" should read, "DC to AC".

Signed and Sealed this
Nineteenth Day of February, 2013

Teresa Stanek Rea
*Acting Director of the United States Patent and Trademark Office*